April 5, 1966 R. M. WORREL 3,243,945
COMBINED SIDE DELIVERY RAKE AND SWATH TURNER
Original Filed Aug. 21, 1961 5 Sheets-Sheet 1

RICHARD M. WORREL
INVENTOR

BY Huebner & Worrel
ATTORNEYS

April 5, 1966 R. M. WORREL 3,243,945
COMBINED SIDE DELIVERY RAKE AND SWATH TURNER
Original Filed Aug. 21, 1961 5 Sheets-Sheet 2
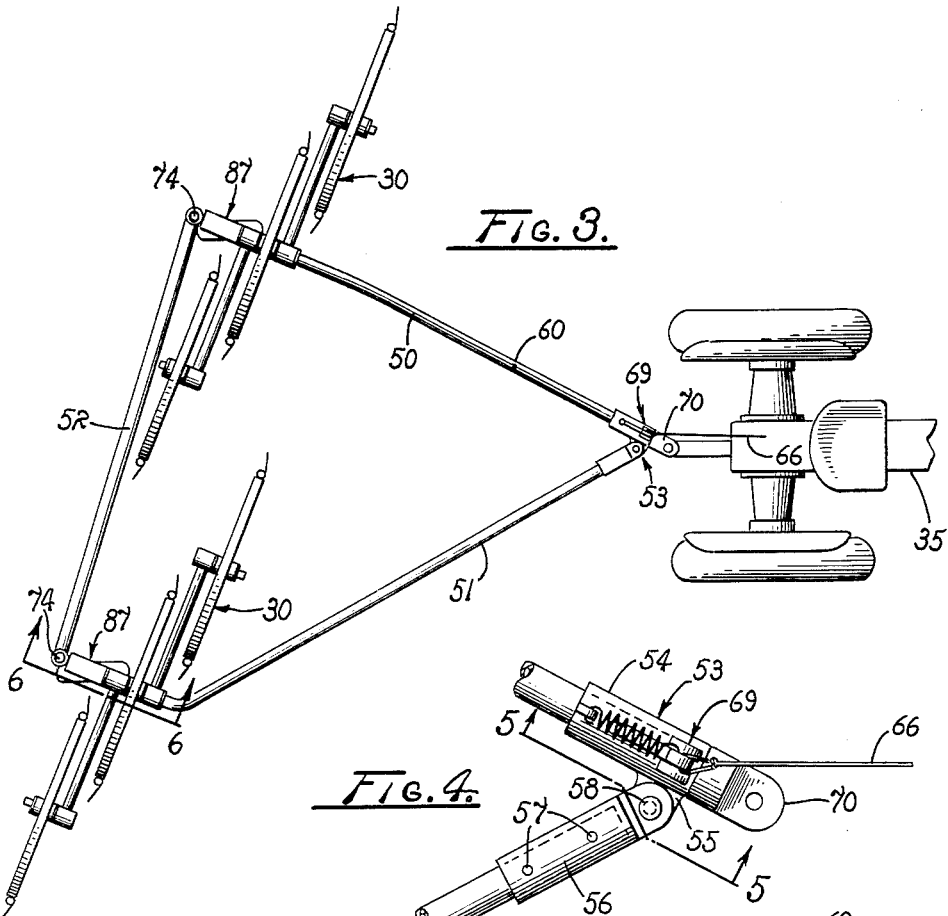
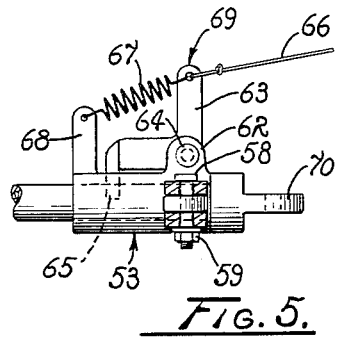
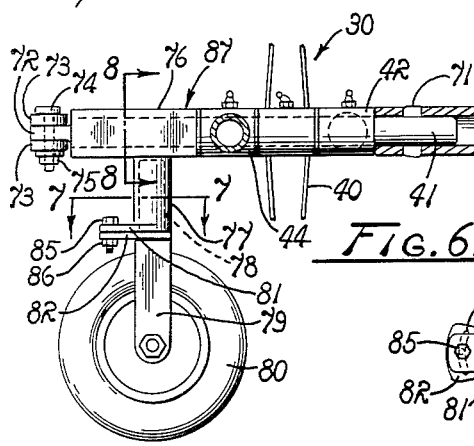
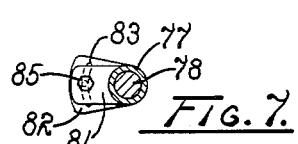
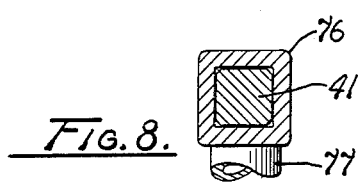
RICHARD M. WORREL
INVENTOR
BY *Huebner & Worrel*
ATTORNEYS

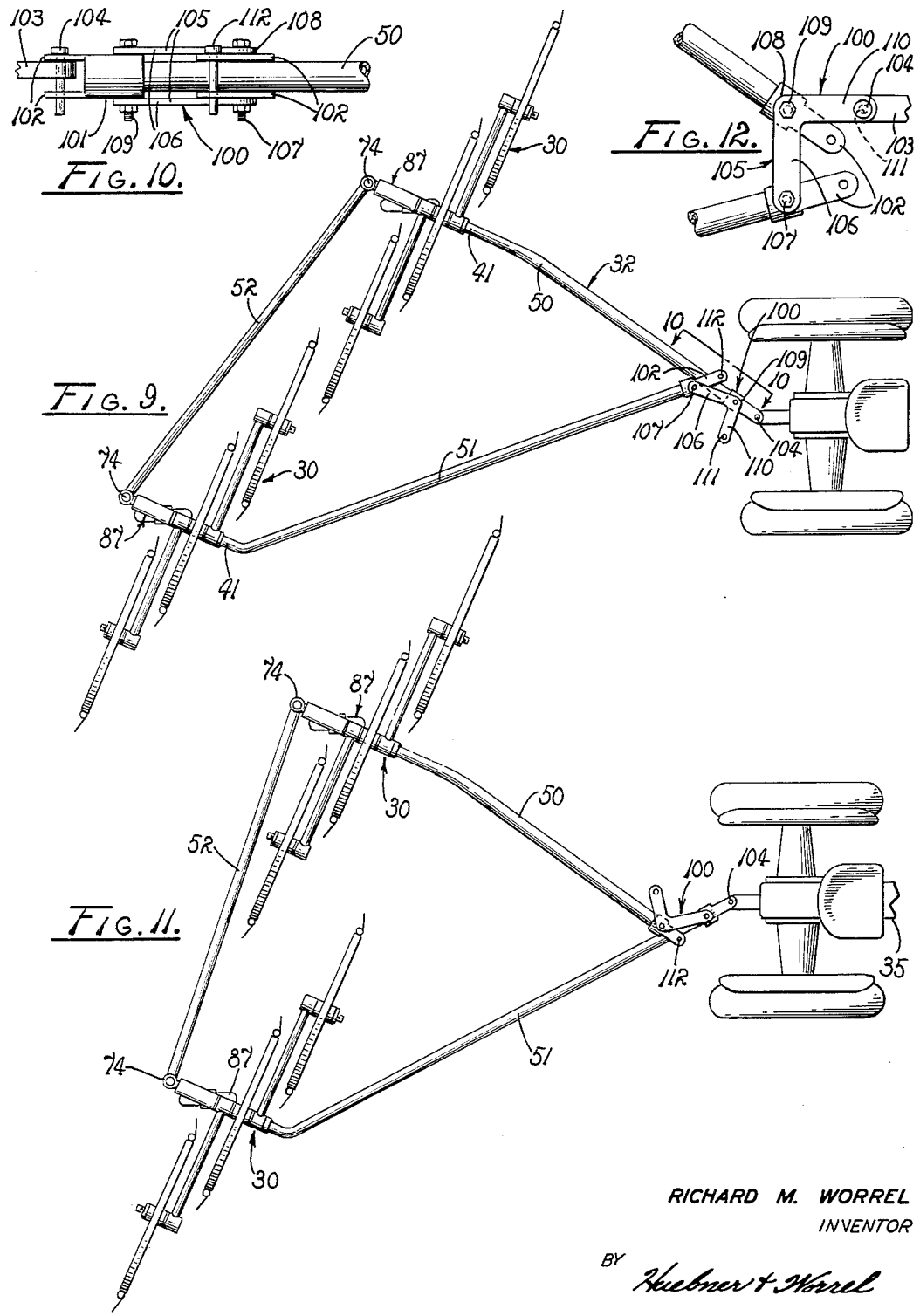

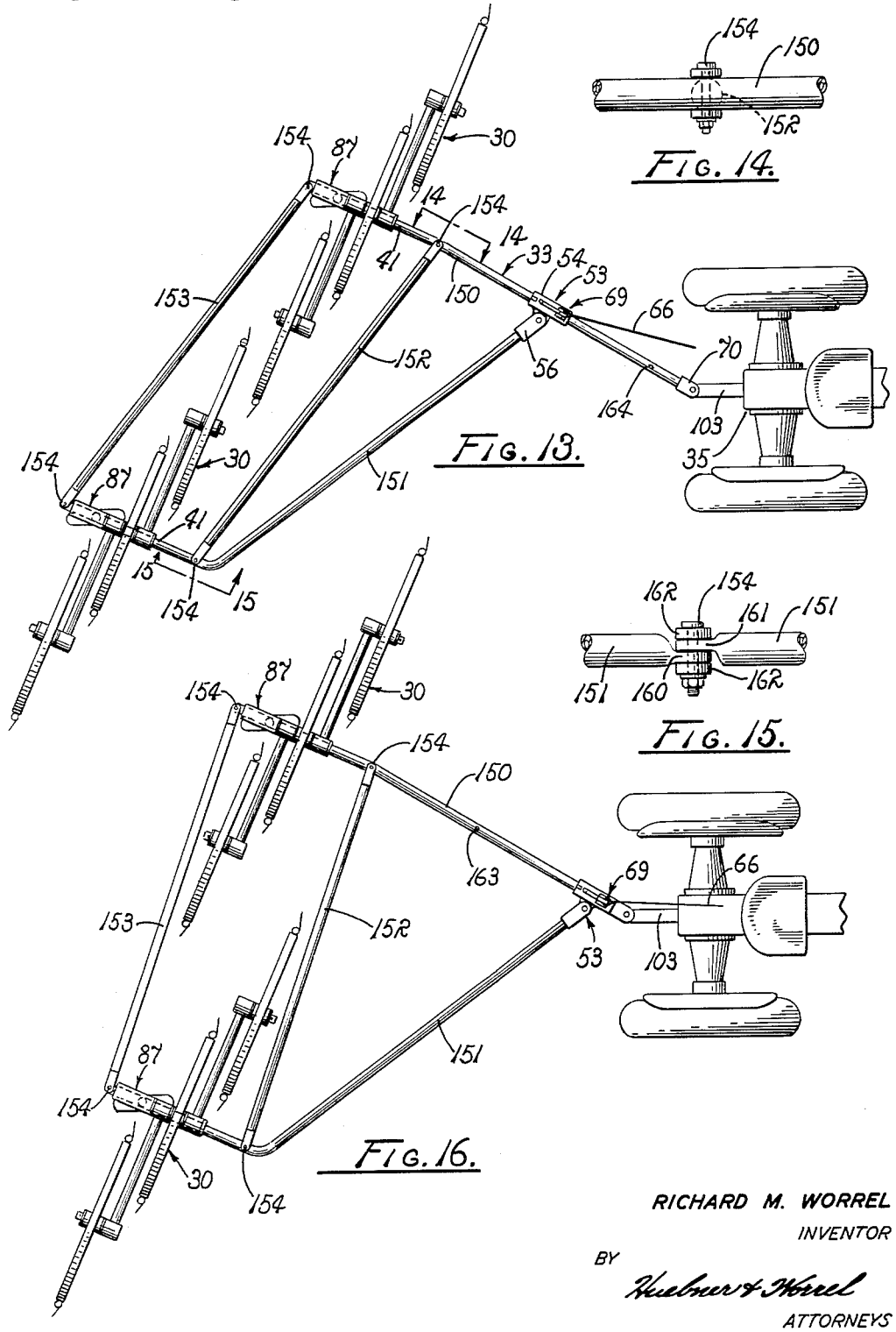

April 5, 1966 R. M. WORREL 3,243,945
COMBINED SIDE DELIVERY RAKE AND SWATH TURNER
Original Filed Aug. 21, 1961 5 Sheets-Sheet 5
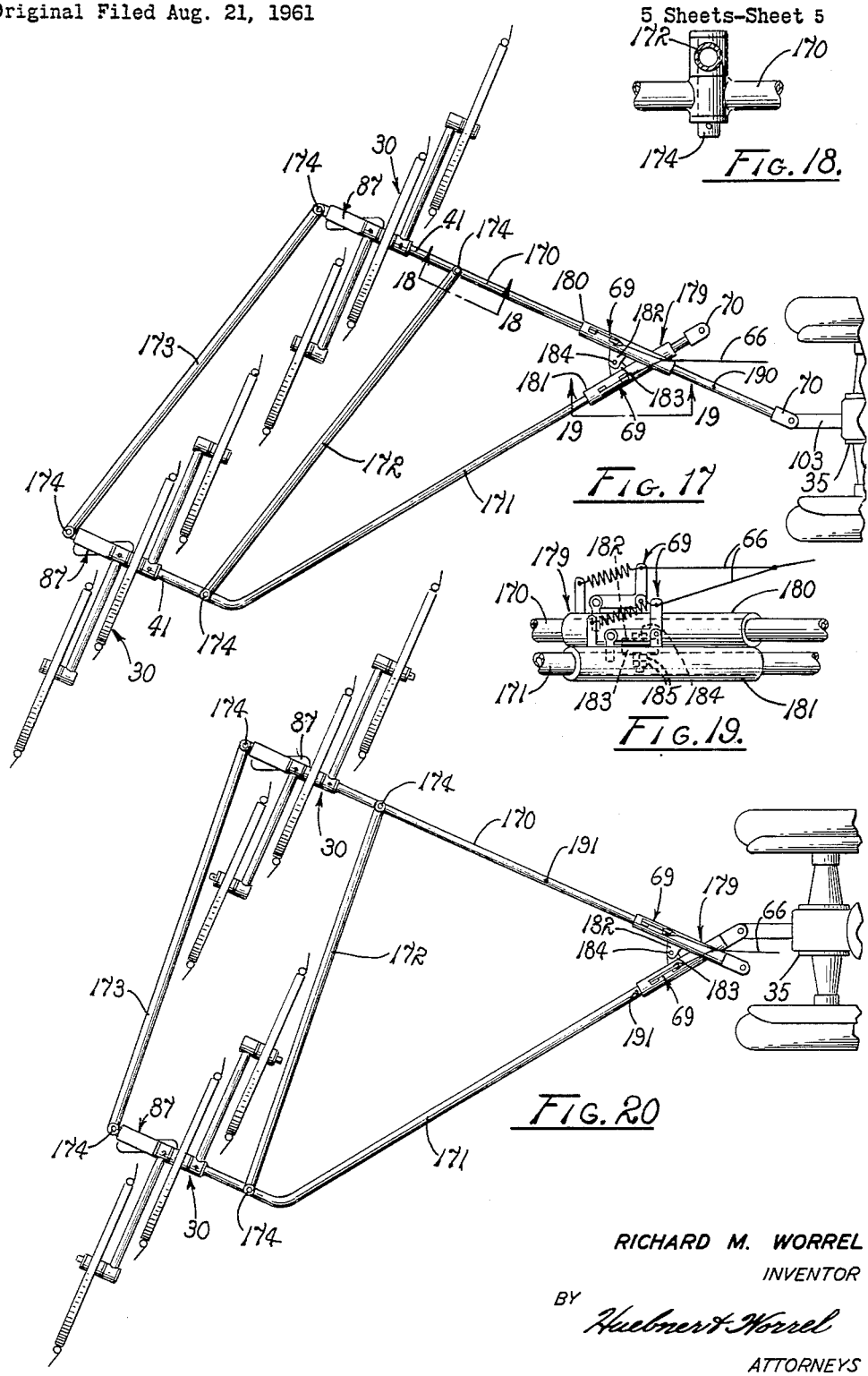
RICHARD M. WORREL
INVENTOR
BY Huebner & Worrel
ATTORNEYS United States Patent Office 3,243,945
Patented Apr. 5, 1966

3,243,945
COMBINED SIDE DELIVERY RAKE AND SWATH TURNER
Richard M. Worrel, Fresno, Calif., assignor of one-half to Herbert A. Huebner, Los Angeles, Calif.
Continuation of application Ser. No. 132,923, Aug. 21, 1961. This application Dec. 24, 1964, Ser. No. 422,074
12 Claims. (Cl. 56—366)

This is a continuation of application Serial No. 132,- 923, filed August 21, 1961, now abandoned. The present invention relates to forage implements and more particularly to a combined side delivery rake and swath turner.

In the harvesting of forage, such as alfalfa, straw, grass, sweet potato vines and the like, it has long been the practice to cut the forage, permit it to cure while lying on the ground, and subsequently to rake the forage for convenience in stacking, baling, or other harvesting operations. In humid climates the presence of moisture has required the turning of the forage during its curing. The usual procedure is to rake the forage subsequent to cutting into relatively light windrows which, after a period of curing, are inverted to attain greater uniformity of curing by an operation known as swath turning. Thereafter the cured light windrows are raked into larger windrows for handling convenience.

Originally, swath and raking operations were necessarily performed with separate implements. With the advent of rotary side delivery wheel rakes, it became possible to provide combined side delivery rakes and swath turners. However, such devices have heretofore required either extensive frame modification and adjustment in converting between rake and swath turned adjustments or the dismounting and relocating of the raking wheels in the frames utilized for such implements. Both tasks have involved more effort and time than desired and the structures involved, although generally accepted in certain areas, have been more complex and expensive than preferred.

An object of the present invention, therefore, is to provide an improved combined side delivery rake and swath turner.

Another object is to provide such an implement which can be more quickly and easily converted from a rake to a swath turner and back again than previously possible.

Another object is to provide such an implement which is simpler in structure than those previously provided for the purpose.

Another object is to provide such an implement which is more economical to produce than those previously available for the purpose and which, because of its simplicity, is readily manufactured in a durable form.

Another object is to provide such an implement having a skewable polygonal frame which is convertible for raking and swath turning operations by skewing of the frame.

Another object is to provide such an implement which is suitable for tractor motivation and which can be converted by a tractor operator for raking and swath turning purposes without assistance and with a minimum of effort.

Further objects and advantages will become more fully apparent in the subsequent description in the specification.

In the drawings:

FIG. 3 is a plan view of the structure of FIGS. 1 and 2 adjusted for swath turning.

FIG. 4 is a fragmentary somewhat enlarged plan view of a tongue coupling member of the first and third forms of the invention.

FIG. 5 is a vertical section taken on line 5—5 of FIG. 4.

FIG. 6 is a fragmentary enlarged side elevation of a rearward end portion of the implement, as viewed from line 6—6 in FIG. 3.

FIG. 7 is a horizontal section taken on line 7—7 of FIG. 6.

FIG. 8 is a vertical section taken on line 8—8 of FIG. 6.

FIG. 9 is a plan view of a second form of the present invention adjusted for raking purposes.

FIG. 10 is a fragmentary enlarged side elevation of a tongue coupling member of the second form, as viewed from line 10—10 in FIG. 9.

FIG. 11 is a plan view of the second form of the present invention adjusted for swath turning purposes.

FIG. 12 is a fragmentary enlarged plan view of the coupling member of the second form shown in a position intermediate the adjustments for raking and for swath turning.

FIG. 13 is a plan view of a third form of the invention adjusted for raking purposes.

FIG. 14 is a fragmentary enlarged side elevation taken on line 14—14 of FIG. 13.

FIG. 15 is a fragmentary enlarged side elevation taken on line 15—15 of FIG. 13.

FIG. 16 is a plan view of the third form of the invention adjusted for swatch turning.

FIG. 17 is a plan view of a fourth form of the present invention adjusted for raking.

FIG. 18 is an enlarged section taken on line 18—18 of FIG. 17.

FIG. 19 is a fragmentary enlarged side elevation taken on line 19—19 of FIG. 17.

FIG. 20 is a plan view of the fourth form of the invention adjusted for swath turning.

Figure 1:
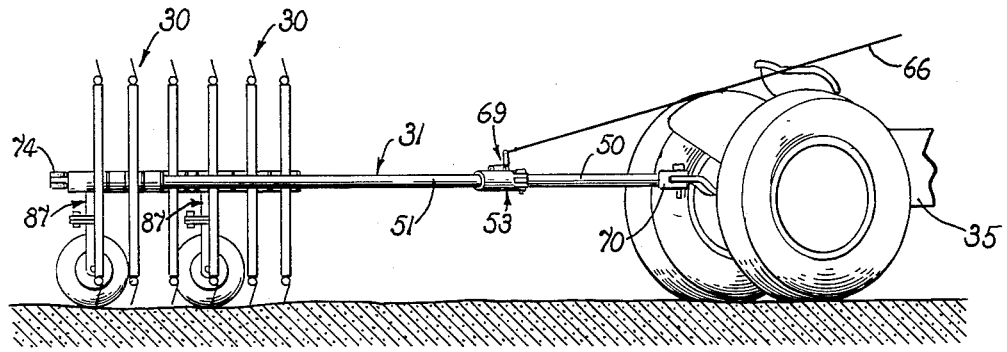
FIG. 1 is an oblique side elevation of a first form of a side delivery rake and swath turner embodying the principles of the present invention, viewed in parallel to raking wheels employed therein, said implement being shown coupled to a tractor which is fragmentarily illustrated.

Referring in greater detail to the drawings:

As will become apparent in the description of the four illustrative forms, the essence of the invention resides in the provision of a plurality of work members or raking sub-assemblies 30, each of which is adapted to engage forage disposed on the ground and during earth traversing movement to gather and to turn the forage transversely of said movement, and means mounting said sub-assemblies for earth traversing movement and adjustable relative positioning between a raking adjustment with said sub-assemblies arranged to feed said forage from one to another into a common windrow and a swath turning adjustment with said sub-assemblies spaced to discharge into separate windrows. The mounting means or frames are individually identified by the numerals 31, 32, 33 and 34, respectively, for the four forms of the invention, and each is shown coupled to a prime mover or tractor 35 for earth traversing movement.

It will be noted that each of the raking sub-assemblies 30 is illustrated as including three rotary raking wheels 40 mounted in overlapping echelon relation oblique to the direction of travel of the tractor 35 and for independent elevational movement in the manner shown and described in my co-pending application Serial No. 101,- 779. It is to be understood that each sub-assembly may consist of any desired number of raking wheels or suitable working members of any type desired.

As illustrated, each sub-assembly 30 consists of a central wheel rotatably mounted concentrically on an axle 41. A bearing 42 is mounted on the axle forwardly of the central raking wheel and a crank arm 43 obliquely forwardly extended therefrom. A forward raking wheel is journaled on the extended end of the crank arm for floating elevational movement in a plane substantially parallel to the central raking wheel. Similarly, a bearing 44 is mounted on the axle 41 rearwardly of the central raking wheel, a crank arm 45 is obliquely rearwardly extended therefrom, and mounts a rear raking wheel for floating elevational movement in substantially parallel relation to the central and forward raking wheels. As shown in the designated co-pending application, the arms 43 and 45 may be resiliently supported, if desired, and any suitable means, not here shown, may be utilized for raising and lowering the arms, even remotely from the tractor, if desired. Facilities for such operation are known and constitute no essential part of the present invention.

While the raking sub-assemblies 30 are identical in the four forms of the invention, the frames 31, 32, 33 and 34 are structurally different although directed to the attainment of equivalent adjustments. As the description progresses, it will be noted that frame 31 of FIGS. 1, 2 and 3 and frame 32 of FIGS. 9 and 11 are skewable substantially triangular frames. Frame 33 of FIGS. 13 and 16 and frame 34 of FIGS. 17 and 20 are skewable parallelogram-triangular frames.

FIRST FORM

Referring to the first form of the invention, the frame 31 consists of a substantially straight tongue 50 and an angular tongue 51. The tongues have rearward ends which are pivotally interconnected in fixed spaced relation by a spacer element 52. The tongues have forward end portions which converge and are pivotally interconnected in adjustable relation by a coupling member 53. The rearward end portions of the tongues 50 and 51 are substantially parallel and constitute the axles 41, each of which mounts a raking sub-assembly 30, in the manner described.

The coupling member 53 includes a sleeve 54 slidably mounted for longitudinal adjustment on the forward end of the tongue 50, as best shown in FIGS. 4 and 5. A flange 55 is transversely extended from the sleeve. A tubular fitting 56 provides a cylindrical portion which is fitted to the forward end of the tongue 50 and secured thereto as by rivets 57. The fitting has a bifurcated forward end which receives the flange 55 and is pivotally secured thereto by a pin 58 having a retaining nut 59.

Figure 2:
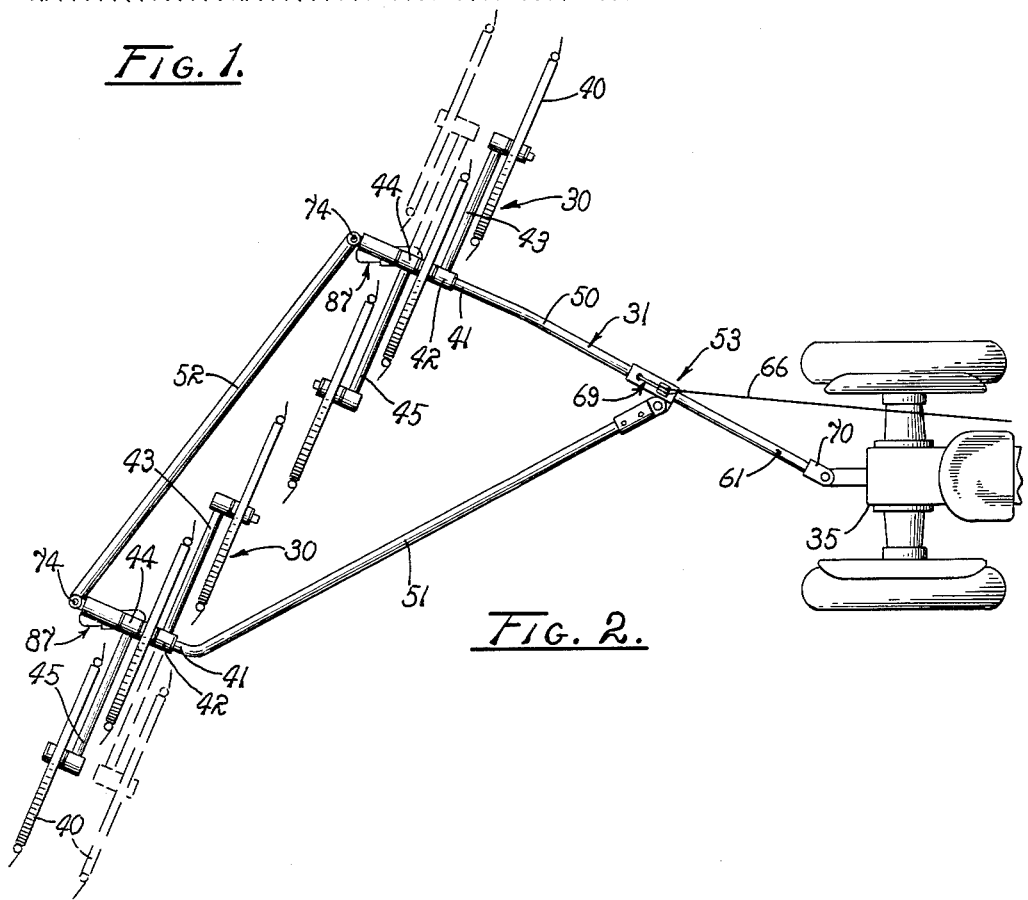
FIG. 2 is a plan view of the structure shown in FIG. 1 adjusted for raking purposes.

It will be understood that the sleeve 54 can slide back and forth on its tongue 50 so as to make possible the skewing of the frame 31 between the raking position shown in FIG. 2 and the swath turning position shown in FIG. 3. As a convenient expedient for selectively latching the sleeve in these positions, a pair of bores 60 and 61 are provided in the tongue 50. A pair of ears 62 are upwardly extended from the sleeve and mount a bellcrank 63 pivotally therebetween on a pin 64. The bellcrank has a detent 65 extended through an opening in the sleeve selectively to engage the tongue 50 within the bores 60 and 61. For convenience of operation, the bellcrank has an upwardly extended arm to which an operating lanyard 66 is connected. A tension spring 67 is also connected to the upwardly extended arm of the bellcrank and to an anchor 68 integral with the sleeve rearwardly of the bellcrank. The bellcrank and its associated mounting and actuating parts constitute a latch mechanism which is generally identified in FIGS. 2 through 5, 13, 16, 17, 19 and 20 by the numeral 69.

The tongues 50 and 51 are conveniently tubular and the tongue 50 has a draft connection 70 rigidly affixed to the forward end thereof. As a production expedient, the axles 41 are shafts which are fitted into the tubular portions of the tongues and are rigidly secured thereto, as by welding at 71. The axles 41 are cylindrical where engaged by the bearings 42 and 44 as well as where engaged by the hub of the central raking wheels 40 but rearwardly of the rear bearing 44 are forged or otherwise formed to a square cross section, as best shown in FIG. 8. The extreme rearward end portion of each axle provides a flange 72. Each end of the spacer element 52 is provided with bifurcated flanges 73 which receive the flanges 72 therebetween. Pins 74 having retaining nuts 75 extend through the flanges 72 and 73 and serve pivotally to interconnect the tongues and the spacer element.

A transversely square box member 76 is fitted to the squared portion of each axle and thus is non-rotatably mounted thereon. It is held in position by abutment with the spacer element 52. An elongated cylindrical socket member 77 is rigidly mounted on the box member 76 and is extended downwardly therefrom. A shaft 78 is journaled in the socket member and provides a fork 79 which rotatably mounts a ground wheel 80. A bracket 81 is rigidly extended radially from the lower end of the socket member 77. A bracket 82 is radially extended from the shaft 78 in facing engagement with the bracket 81. A bore is provided in the bracket 81 which registers with an arcuate slot 83 in the bracket 82. A bolt 83 is extended through the bore and slot and receives a nut 86 which when tightened secures the brackets in adjusted rotational relation, holds the socket member and tubular member in association, and determines the angularity of the wheel 80 with respect to the frame 31. The wheels 80 and the described associated structures for mounting the rearward end portions of the tongues on the wheels constitute frame support and guide members, indicated generally at 87, and subsequently so referred to herein. As shown, the rearward end of each tongue in each of the illustrative forms of the invention is borne by a support and guide member 87.

SECOND FORM

The second form of the invention is illustrated in FIGS. 9 through 12. The frame 32 thereof is of the same structure as the first form except for the substitution of a coupling member 100 for the coupling member 53 of the first form and in that the second form has a different adjustment action. Thus, frame 32 employs the described tongues 50 and 51 which mount raking sub-assemblies 30 and have rearward end portions supported by frame support and guide members 87 and which are pivotally interconnected by a spacer element 52 at 74.

In the second form of the invention, the forward end of each tongue is provided with a sleeve 101 which is welded or otherwise rigidly secured thereto. A pair of spaced ears 102 extend endwardly therefrom and are adapted to receive a drawbar 103 of the tractor 35 therebetween. The ears constitute a clevis which is releasably connected to the drawbar by a removable pin 104 in the well known manner. The ears are also spaced so as to be able slidably to receive therebetween the tongue opposite that on which they are mounted. Congruent upper and lower bellcranks 105 each have legs 106 pivotally connected to the sleeve mounted on the tongue 51 at 107 in spaced relation to its clevis ears for pivotal movement about an erect axis. Each bellcrank also has an elbow 108 pivotally connected to the sleeve mounted on the tongue 50 at 109 in spaced relation to its clevis ears also for movement about an erect axis. Each bellcrank also has an extended leg 110 having a bore 111 therethrough. As will subsequently become apparent, the legs 110 are parallel and constitute a clevis which also can be connected to the drawbar 103, as shown in FIG. 12, in adjusting the frame 32 between raking and swath turning positions. In raking adjustment, the ears 102 on the tongue 51 extend above and below the tongue 50. A pin 112 is extended through the bores in the ears of the sleeve on the tongue 51 and serves releasably to lock the tongue 50 therebetween.

THIRD FORM

The frame 33 of the third form of the invention utilizes a rigid tongue 150 and an articulated tongue 151. As before, the forward portions of the tongues are conveniently tubular and axles 41 are rigidly mounted in their rearward end portions. Also, as before, the axles are substantially parallel and are supported by support and guide members 87 of the form previously described. Forward and rearward spacer elements 152 and 153, respectively, pivotally interconnect the tongues in parallel spaced relation by means of pivot pins 154 and with the axles 41 form a parallelogram. Each axle mounts a raking sub-assembly 30 of the form described.

The forward end portion of the tongue 150 is provided with a draft connection 70. Similarly, the forward end of the tongue 151 is slidably and pivotally connected to the tongue 150 by means of a coupling member 53 provided with a latch mechanism 69, likewise previously described.

As best shown in FIG. 15, the tongue 151 is articulated at the corner of its juncture with the parallelogram portion of the frame formed by the spacer elements 152 and 153 and the axles 41. This is conveniently accomplished by extending the pivot pin 154 through ears 160 and 161 formed on divided portions of the tongue at said corner and through ears 162 provided on the end of the spacer element 152. It will be apparent that the parallelogram portion of the frame can be skewed, as desired, by moving the sleeve 54 of the coupling member 53 fore and aft on the tongue 150 which provides bores 163 and 164 adapted to receive the detent of the latch mechanism 69 borne by the coupling member.

FOURTH FORM

The frame of the fourth form of the invention is substantially similar to that of the third form except that it utilizes a pair of rigid tongues 170 and 171. The tongues each provide axles 41 which mount raking sub-assemblies 30 in the manner previously described. Spacer elements 172 and 173 pivotally interconnect the rearward end portions of the tongues fore and aft of the sub-assemblies 30 in parallel spaced relation by means of pivot pins 174. As before, the rearward end portions of the tongues are supported by support and guide members 87.

The forward end of each tongue is provided with a draft connection 70 and the connections are adapted for alternate connection to the drawbar 103 of the tractor.

Because of the rigidity of the tongues 170 and 171 a different type of coupling member 179, best shown in FIGS. 19 and 20, is employed. An elongated sleeve 180 is slidably mounted on the tongue 170 and a similar sleeve 181 is slidably mounted on the tongue 171. The sleeves may be rigidly interconnected since the tongues are always in precisely the same angular relation but it is found to facilitate slidable movement on their respective tongues if they are pivotally interconnected. This is conveniently accomplished by providing a pair of arcuate plates 182 and 183. The plate 182 is welded tangentially to the bottom of the sleeve 180 and the plate 183 is welded tangentially to the top of the sleeve 181 so that the plates are in facing engagement. Aligned bores are formed through the plates rearwardly of the intersection of the sleeves and a pivot bolt 184 extended therethrough. A pair of jamb nuts 185 are screw-threadably mounted on the pivot bolt to retain it in position. So interconnected, the sleeves may easily be correspondingly slid fore and aft on their respective tongues incident to skewing of the frame 34, as will hereinafter become more clearly apparent.

Latch mechanisms 69, previously described, are provided on each of the sleeves and are adapted releasably to engage forward bores 190 and rearward bores 191 in their respective tongues.

OPERATION

The operations of the four forms of the subject invention are essentially similar and are briefly reviewed at this point. It will be recalled that the frame 31 of the first form of the invention is a skewable substantially triangular frame utilizing a pair of rigid tongues 50 and 51. The second form of the invention employs a skewable substantially triangular frame 32 which also utilizes the rigid tongues 50 and 51 but provides a toggle connection for the forward end portions of the tongues resulting in a somewhat different skewing action. The frame 33 of the third form is a skewable parallelogram-triangular frame which utilizes a rigid tongue 150 and a tongue 151 which is articulated at its juncture with the parallelogram portion of the frame. The frame 34 of the fourth form of the invention is likewise of parallelogram-triangular form but it utilizes rigid tongues 170 and 171 and a different coupling member 179 from that indicated at 53 employed in the first and third forms of the invention and at 100 in the second form. In each instance, the raking sub-assemblies 30 are aligned for cooperative action for raking purposes, as shown in FIGS. 1, 2, 9, 13 and 17, and are moved relatively axially, and thus misaligned, for swath turning purposes, as shown in FIGS. 3, 11, 16 and 20.

As is well known in rotary side delivery wheel rakes, the raking wheels are rotated during earth traversing movement by contact with the forage and/or ground and exert a lateral force on the rake incident to lateral movement of the forage. Such force must be resisted and the wheels 80 serve this purpose in all illustrated forms of the invention. It will also be recognized that the wheels of the support and guide members 87 are always arranged in parallelism and through their angular adjustment with respect to their various frames determine the angularity of the raking wheels 40 with respect to the direction of travel. For illustrative convenience, the raking wheels 40 are shown in approximately as great an angular relation to the direction of travel as is practical. If operating conditions are such that the raking wheels do not properly operate at such angularity, the nuts 86 are loosened on the bolts 85 and the angularity of the ground wheels 80 adjusted, as desired, to achieve optimum raking wheel angularity and the nuts tightened to retain such adjustment.

FIRST FORM

Referring specifically to the first form of the invention, it is operable as a rake as shown in FIGS. 1 and 2, the tractor 35 serving to draw the device in earth traversing movement, the raking wheels 40 engaging forage on the ground and, being rotated in a common direction as a result thereof, roll the forage into a common windrow, not shown, deposited by the rearwardmost raking wheel.

To convert from a rake to a swath turner, either the rearwardmost raking wheel 40 of the forward raking sub-assembly 30 or the forwardmost raking wheel of the rearward sub-assembly is pivoted out of the way to permit the sub-assemblies to pass each other. It will be understood that either of such raking wheels may be retracted. It is not necessary to retract both. In FIG. 2, the retracted positions of both of said wheels are shown in dashed lines. The lanyard 66 is tensioned to remove the detent 65 from the bore 60. The tractor is then backed to skew the frame from the position shown in FIG. 2 to that shown in FIG. 3. The lanyard is then released and the detent 65 permitted to drop into the bore 61. In such adjustment, the left sub-assembly 30 is positioned rearwardly of the right sub-assembly and cooperative action to discharge into single windrow is impossible. So adjusted, the retracted raking wheel is returned to operating position and the implement is drawn by the tractor so as to encounter forage in two separate swaths. If the forage has already been windrowed, the windrows are turned. If the forage has not previously been windrowed, the sub-assemblies deposit encountered forage in two windrows smaller than that formed by the device when employed as a rake and thus more readily dried.

To convert from a swath turner to a rake, one of the adjacent raking wheels of the sub-assemblies is raised to permit the sub-assemblies to pass, the lanyard is tensioned to withdraw the detent 65 from the bore 61 and the tractor 35 driven forwardly until the frame 13 is skewed to the adjustment shown in FIG. 2 whereupon the lanyard is released and the latch mechanism 69 locks the frame in such adjustment.

SECOND FORM

Referring to the second form of the invention, it is operated as a rake when adjusted as shown in FIG. 9. Upon forward movement of the tractor 35, each raking wheel is rotated by forage which is gathered and rolled laterally into a single windrow discharged by the rearwardmost raking wheel.

As before, to convert from a rake to a swath turner, one of the adjacent raking wheels 40 of the raking sub-assemblies 30 is pivoted upwardly on its respective arm 43 to permit the sub-assemblies to pass. The pin 112 is withdrawn to release the tongue 51 from its connection to the tongue 50. The pin 104 is withdrawn to disconnect the implement from the drawbar 103. The drawbar then is connected to the legs 110 of the bellcrank by aligning the bores 111 with the bore in the drawbar and extending the pin 104 therethrough. The tractor is driven forwardly to turn the bellcrank to the position shown in FIG. 12. The pin 104 is again withdrawn and the drawbar connected to the ears 102 on the tongue 51 by reinsertion of the pin 104 therethrough. The tractor is then driven forwardly and turned to the left causing the drawbar 51 to cross in front of the drawbar 50 and moving the drawbar 51 forwardly with respect to the drawbar 50. This forces the raking assembly 30 on the left rearwardly relative to the raking assembly on the right. When this has been accomplished, the elevated or retracted raking wheel is returned to operable position, the pin 112 is extended through the bores in the ears on the tongue 50 and thus serves to interconnect the tongues.

The described conversion from the raking adjustment of FIG. 9 to the swath turning adjustment of FIG. 11 provides a convenient powered method of effecting the conversion. In most instances, it is not necessary to connect the drawbar to the leg 110 of the bellcrank as an intermediate step, the bellcrank having sufficient leverage that the described adjustment can be made manually. It will be apparent that during such adjustment, the rigid tongues 50 and 51 pivot outwardly about their respective connections to the spacer element 52 and then toward each other as the adjustment is completed.

In operation as a swath turner, the implement adjusted as shown in FIG. 11 is drawn over the ground by the tractor 35 and the raking sub-assemblies 30 engage independent swaths of forage or separate windrows, turn the forage or windrows encountered and discharge the forage or windrows in two separate windrows at the rearward edge of the rearward raking wheel 40 of each sub-assembly.

THIRD FORM

The third form of the invention is operated as a rake in the adjusted position shown in FIG. 13. To convert to a swath turner, one of the adjacent raking wheels 40 of the sub-assemblies 30 is raised to permit the sub-assemblies to pass, as before. The lanyard 66 is tensioned to release the latch mechanism 69. The coupling member 53 is then slid forwardly on the rigid tongue 150 as permitted by the articulation of the tongue 151 at its juncture with the parallelogram portion of the frame. This action may be conveniently accomplished by backing the tractor 35 to force the tongue 150 rearwardly through the coupling member 53 as the lanyard is pulled tightly enough to release the latch mechanism and to keep the coupling member from traveling rearwardly with said tongue. Such relative movement skews the frame to the adjustment shown in FIG. 16. When so adjusted, the lanyard is released so that the spring 67 can thrust the detent 65 into the bore 164. The elevated or retracted raking wheel is, of course, returned to operable position, if desired, when the swath turning adjustment is made. So conditioned, the tractor is employed to draw the implement so that the sub-assemblies 30 gather and turn encountered forage or windrows, as previously described.

To reconvert to a rake, one of said adjacent raking wheels is again retracted to permit the sub-assemblies to pass, the lanyard 66 is drawn to release the latch mechanism 69, and the tractor is driven forwardly until the resistance to forward travel offered by the raking wheels 40 skews the frame 43 to the adjustment shown in FIG. 13. Thereupon the lanyard is released and the spring 67 causes the detent 65 to drop into the bore 163.

FOURTH FORM

The fourth form of the invention is employed as a rake in the adjustment shown in FIG. 17 in which the tractor is coupled to the substantially straight tongue 170 and the sleeves 180 and 181 are locked in position on their respective tongues by the detent 65 of their latch mechanism 69 dropping into the bores 191.

To convert to a swath turner, one of the adjacent raking wheels 40 of the sub-assemblies 30 is retracted, the lanyards 66 are pulled to release the latch mechanisms 69 and the tractor is backed to force the tongue 170 rearwardly through its sleeve 180 as the lanyard holds the sleeve against rearward movement. The detent of the latch mechanism 69 on the sleeve 180 is permitted to drop into its bore 190 when the tongue 170 is moved rearwardly to swath turning position. The tractor is then coupled to the forward end of the tongue 171 and, if it is not already thrust rearwardly through its sleeve 181, the tractor is backed to accomplish the purpose and the latch mechanism 69 on the sleeve 181 operated to permit the detent to be received within the bore 190 in the tongue 171. So adjusted, the implement is drawn in earth traversing movement and the sub-assemblies perform their swath turning functions in the manner previously described.

In converting to a rake, the tractor 35 is coupled to the forward end of the tongue 170, the latch mechanisms 69 released by pulling on the lanyard, and the tractor driven forwardly until the frame 34 is skewed to the adjustment shown in FIG. 1 whereupon the latch mechanisms are released and their detents engage in the bores 191 locking the frame in raking adjustment.

Normally, the guide wheels 80 of the support and guide members 87 need not be angularly adjusted in converting the structures between the raking and swath turning adjustments. Of course, they may be angularly readjusted to increase or decrease the angles of the raking wheels with respect to the line of travel, as desired, and correspondingly to vary the raking or turning swaths.

The illustrative forms of the invention constitute simplified structures for achieving the combined raking and swath turning operations. Being simplified, they are more economical and trouble-free than the previous devices provided for the purpose. They have in common that their frames are skewed to one position to align the raking wheels in cooperative adjustment whereby they may concurrently engage and roll a common windrow. By simply shifting the sub-assemblies relatively fore and aft, the raking alignment is disrupted so that each sub-assembly operates independently for tedding, swath turning, and windrow turning operations. The adjustments are speedily and easily accomplished. Except for the retraction of an adjacent raking wheel to permit the sub-assemblies to pass each other, all conversions can be made without requiring an operator to dismount from the tractor, and even raking wheel retraction from the tractor is possible by the incorporation of devices already known in the art for the purpose. All of the forms of the invention permit the conversion without substantial frame reconstruction or dismounting and remounting of any of the raking wheels.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A combined side delivery rake and swath turner comprising a rigid substantially straight tongue having predetermined forward and rearward end portions, a rigid angular tongue having predetermined forward and rearward end portions, means pivotally interconnecting the forward end portions of the tongues, a substantially rigid spacer pivotally interconnecting the rearward end portions of the tongues in spaced relation with said end portions substantially parallel, raking assemblies individually mounted on the rearward end portions of the tongues, the means pivotally interconnecting the forward end portions of the tongues including a first element mounted on the straight tongue having a connector portion pivotally connected to the forward end portion of the angular tongue and adjustably shiftable longitudinally of said straight tongue between predetermined positions with said raking assemblies in cooperative proximity and in spaced relation, and means for releasably latching said connector portion selectively in said predetermined positions.

2. A combined side delivery rake and swath turner comprising a skewable frame including a pair of rigid tongues having spaced rearward end portions and convergent forward end portions adapted for connection to a draft appliance, one of said tongues being substantially straight, directional control means mounted on the tongues in supporting relation to the rearward end portions thereof, a substantially rigid spacer pivotally interconnecting the rearward end portions of the tongues in predetermined fixed spaced relation, means interconnecting the forward end portions of the tongues for relative forward and rearward movement whereby the frame is alternately skewed into predetermined raking and swath turning adjustments, the rearward end portions of the tongues being in substantially parallel relation to each other and fixed angular relation to their respective forward end portions when the frame is in its predetermined raking and swath turning adjustments, said tongue interconnecting means including a guide element mounted on the forward end portion of one of the tongues and pivotally connected to the forward end portion of the other tongue interconnecting the tongues and guiding said other tongue forwardly and rearwardly with respect to the one tongue between predetermined positions with the frame in said raking and swath turning adjustments while the tongues remain interconnected, releasable means latching the forward end portions of the tongues alternately in said positions, and a plurality of rake sub-assemblies mounted in laterally adjacent relation directly on the rearward end portions of the tongues in fixed angular relation thereto positioned to feed encountered forage from one to the other when the frame is in raking adjustment and being spaced to preclude such feeding from one to the other when the frame is in swath turning adjustment.

3. A combined side delivery rake and swath turner comprising a pair of side delivery rake sub-assemblies adapted during earth traversing movement to engage forage crops disposed on the ground and to deliver such crops laterally into a windrow, a pair of tongues having substantially parallel rearward end portions integral therewith and convergent forward end portions, means pivotally interconnecting the rearward end portions of the tongues in fixed spaced relation, one of the rake sub-assemblies being mounted on each of the rearward end portions of the tongues in fixed angular relation thereto, means interconnecting the forward end portions of the tongues for relative forward and rearward adjustable positioning selectively to dispose the rake sub-assemblies in cooperative alignment to feed encountered forage from one thereof to the other for discharge into a single windrow and a position shifted fore and aft with respect to each other independently to discharge encountered forage into respective windrows, said tongue interconnecting means including a guide element mounted on the forward end portion of one of the tongues and pivotally connected to the forward end portion of the other tongue interconnecting the tongues and guiding said other tongue forwardly and rearwardly with respect to the one tongue between predetermined positions with the frame in said raking and swath turning adjustments while the tongues remain interconnected, and releasable means latching the forward end portions of the tongues alternately in said positions.

4. A combined side delivery rake and swath turner comprising a pair of side delivery rake sub-assemblies adapted during earth traversing movement to engage forage crops disposed on the ground and to deliver such crops laterally in a common direction into respective windrows; a frame including a pair of tongues having substantially parallel rearward end portions integral therewith and convergent forward end portions; one of said tongues having fixed substantially aligned forward and rearward end portions and the other having fixed angularly related forward and rearward end portions; means pivotally interconnecting the rearward end portions of the tongues in fixed spaced relation, one of the rake sub-assemblies being mounted on each of the rearward end portions of the tongues in fixed angular relation thereto; means interconnecting the forward end portions of the tongues for relative forward and rearward adjustable movement selectively to dispose the rake sub-assemblies in cooperative alignment to feed encountered forage from one thereof to the other for discharge into a single windrow and displaced relatively forwardly and rearwardly from said alignment to discharge encountered forage into respective windrows, said tongue interconnecting means including a guide element mounted on the forward end portion of one of the tongues and pivotally connected to the forward end portion of the other tongue interconnecting the tongues and guiding said other tongue forwardly and rearwardly with respect to the one tongue between predetermined positions with the frame in said raking and swath turning adjustments while the tongues remain interconnected, releasable means latching the forward end portions of the tongues alternately in said positions; and a pair of guide wheels mounted in supporting relation to the frame rearwardly of the rake sub-assemblies in substantially parallel relation and constant angular relation to the rearward end portions of the tongues.

5. A combined side delivery rake and swath turner comprising a frame including a pair of tongues having substantially parallel rearward end portions and convergent forward end portions integral with their respective rearward end portions, one of said tongues having fixed substantially aligned forward and rearward end portions and the other having fixed angularly related forward and rearward end portions, means pivotally interconnecting the rearward end portions of the tongues in fixed spaced relation, and means interconnecting the forward end portions of the tongues for relative forward and rearward adjustable movement of said tongues between predetermined raking and swath turning positions, said tongue interconnecting means including a guide element mounted on the forward end portion of one of the tongues and pivotally connected to the forward end portion of the other tongue interconnecting the tongues and guiding said other tongue forwardly and rearwardly with respect to the one tongue between predetermined positions with the frame in said raking and swath turning adjustments while the tongues remain interconnected, releasable means latching the forward end portions of the tongues alternately in said positions; a pair of guide wheels mounted in supporting relation to the frame individually on the rearward end portions of the tongues in substantially parallel planes oblique to the rearward end portions of the tongues; and a raking assembly mounted on the rearward end portion of each tongue each having a plurality of raking wheels mounted on its respective tongue in fixed angular relation thereto, the raking wheels being disposed in substantially oblique alignment in substantially erect parallel planes angularly disposed to the planes of the guide wheels and normal to the rearward end portions of the tongues and in forwardly overlapping relation when the tongues are in raking position whereby the raking wheels feed encountered forage during earth traversing movement into a single windrow and in swath turning position said raking wheels being arranged in two groups spaced for independent operation.

6. A combined side delivery rake and swath turner comprising a pair of substantially parallel frame axles having tongue portions integral therewith extended convergently from corresponding ends thereof, one of the axles being substantially aligned with its respective tongue portion and the other axle being in fixed angular relation to its respective tongue portion, a rigid member pivotally interconnecting the axles in fixed spaced relation, means interconnecting the forward ends of the tongue portions in alternate positions so as axially adjustably to position the frame axles with respect to each other, said means interconnecting the tongue portions including an element mounted on one of the tongue portions having a connector portion integral therewith pivotally connected to the other tongue portion, said element being adjustably positionable longitudinally of its respective tongue portion to move the opposite tongue portion forwardly and rearwardly with respect thereto, arms pivotally mounted on said frame axles and oppositely substantially horizontally extended therefrom providing arm axles substantially parallel to the frame axles, and raking wheels journaled on the arm axles disposed in substantially erect parallel planes normal to the axles, the raking wheels in one adjustment of the tongue portions being in forwardly overlapping oblique alignment to deliver encountered forage into a common windrow and said raking wheels in the other of said positions of the tongue portions being disposed in spaced groups adapted to discharge encountered forage into a pair of separate windrows.

7. A combined side delivery rake and swath turner comprising a pair of tongues having predetermined forward and rearward end portions, one of said tongues having fixed substantially aligned forward and rearward end portions and the other having fixed angularly related forward and rearward end portions, a pair of substantially parallel elongated elements pivotally interconnecting the rearward end portions of the tongues in substantially parallel relation to form a skewable parallelogram therewith, said tongues forwardly converging from said elements, means interconnecting the tongues in relative forward and rearward adjustment to skew the parallelogram formed by the elements and the rearward end portions of the tongues, said means interconnecting the tongues including an element mounted on one of the tongues having a connector portion integral therewith pivotally connected to the other tongue, said element being adjustably positionable longitudinally of its respective tongue to move the opposite tongue forwardly and rearwardly with respect thereto, and raking means mounted on the rearward end portions of the tongues in fixed angular relation thereto and alignable upon skewing the parallelogram to one position to deliver encountered forage from one to the other into a single windrow and spaced to deliver into separate windrows when said parallelogram is skewed into a second position.

8. In an agricultural implement adapted to be motivated along a predetermined path of travel in earth traversing movement the combination of a draft frame including a pair of substantially rigid rearwardly divergent draft elements having respective forward and trailing ends, connecting means pivotally interconnecting the draft elements at respective points adjacent to their forward ends, and a longitudinally rigid spacer element pivotally interconnecting the draft elements at respective points adjacent to their trailing ends in fixed spaced relation with said trailing ends in substantially parallel relation, a pair of laterally spaced work members, means mounting the work members on the frame in fixed angular relation to the trailing ends of the draft elements, the work members having first respective longitudinal positions along said path of relative cooperation and second respective longitudinal positions of independent operation, said connecting means including a first element mounted on one draft element having a connector portion pivotally connected to the other draft element adjacent to the forward end thereof and adjustably shiftable longitudinally of said one draft element between predetermined positions with said work members alternately in cooperative proximity and in spaced relation for independent operation; and means for releasably latching said connector portion selectively in said positions.

9. A combined hay rake and windrow turner adapted for connection to a prime mover in a dependently motivated relationship in a predetermined direction of travel comprising a draft frame including a pair of laterally adjacent rigid tongues having convergent forward end portions and substantially parallel spaced rearward axle end portions, means interconnecting the forward end portions of the tongues for relative fore and aft shifting of the tongues, longitudinally of said direction of travel between predetermined raking and windrow turning positions, said interconnecting means including an element mounted on one tongue having a connector portion adjustably positionable longitudinally along its respective tongue and pivotally connected to the opposite tongue, a pair of raking assemblies individually mounted on said axle end portions in substantially fixed angular relation thereto and being adapted to engage encountered hay and to convey it laterally and obliquely rearwardly in the frame in a common direction transversely of the frame during travel of the frame, said raking assemblies being in substantial alignment obliquely of said direction of travel when the tongues of the frame are in raking positions whereby one of the assemblies is relatively rearwardly of the other and the assemblies convey hay from one to another into a single windrow and the assemblies being shifted from alignment relatively longitudinally of said direction of travel when the tongues are in windrow turning positions whereby the assemblies discharge encountered hay independently of each other, a rigid beam pivotally interconnecting the rearward end portions of the tongues in substantially constant predetermined spaced relation in the frame in both raking and windrow turning positions, and means coupling the frame to a prime mover to apply a draft force to the frame and selectively to effect relative longitudinal shifting of said tongues while maintaining their respective lateral positions relative to said direction of travel, the axle end portions in substantially parallel relation, and the raking assemblies in fixed angular relation to the tongues.

10. A combined hay rake and windrow turner comprising a rigid substantially straight tongue having predetermined forward and rearward end portions, a rigid angular tongue having a forward end portion adjacent to the forward end portion of the straight tongue being rearwardly divergent from the straight tongue and having a rearward end portion substantially parallel to the rearward end portion of the straight tongue and spaced therefrom, a substantially rigid spacer pivotally interconnecting the rearward end portions of the tongues in predetermined fixed spaced relation, a pair of raking assemblies individually mounted directly on the rearward end portions of the tongues adapted to engage encountered hay and to convey it laterally and obliquely rearwardly in the frame in a common direction transversely of the frame during travel of the frame, each raking assembly including a rotary raking wheel disposed in a substantially erect plane normal to the rearward end portion of its respective tongue and fixed in such relation thereto, and means interconnecting the forward end portions of the tongues for relative forward and rearward shifting of the tongues between predetermined raking and windrow turning positions while maintaining the rearward end portions of the tongues in substantially parallel relation, said tongue interconnecting means including a first element mounted on the forward end portion of one of the tongues for movement with respect thereto and having a connector portion shiftable longitudinally of said one tongue incident to said movement, a second element pivotally connecting the forward end portion of the other tongue to said connector portion whereby the frame is alternately skewed into predetermined raking and swath turning adjustments by relative forward and rearward movements of the interconnected forward end portions of the tongues while the tongues remain interconnected, and latch means releasably interconnecting the tongues alternately in said positions.

11. A combined side delivery rake and swath turner comprising a draft frame including a pair of substantially rigid rearwardly divergent draft elements having respective forward and trailing ends, connecting means pivotally interconnecting the draft elements at respective points adjacent to their forward ends, and a longitudinally rigid spacer element pivotally interconnecting the draft elements at respective points adjacent to their trailing ends in fixed spaced relation; a pair of laterally spaced raking assemblies; means mounting the raking assemblies on the frame in substantially fixed angular relation thereto, said connecting means including a guide element on the forward end portion of one of the draft elements and pivotally connected to the other draft element adjacent to the forward end thereof and guiding said other draft element forwardly and rearwardly with respect to the one draft element between a predetermined raking position with the raking assemblies disposed in cooperative alignment to feed encountered forage from one thereof to the other for discharge into a single windrow and a predetermined swath turning position with the raking assemblies shifted fore and aft with respect to each other independently to discharge encountered forage into respective windrows; and releasable means latching the forward end portions of the draft elements alternately in said positions.

12. In a combined side delivery rake and swath turner adapted to be motivated along a predetermined path of travel in earth traversing movement the combination of a draft frame including a pair of substantially rigid rearwardly divergent draft elements having respective forward and trailing ends, connecting means pivotally interconnecting the draft elements at respective points adjacent to their forward ends, and a longitudinally rigid spacer element pivotally interconnecting the draft elements at respective points adjacent to their trailing ends in predetermined spaced relation with said trailing ends in substantially parallel relation, a plurality of rotary raking wheels mounted in the rearward end portion of the frame in fixed substantially parallel relation oblique to said predetermined path of travel, said connecting means including a guide element mounted on the forward end portion of one of the draft elements and pivotally connected to the other draft element adjacent to the forward end thereof and guiding said other draft element forwardly and rearwardly with respect to the one draft element between a predetermined raking position with the raking wheels disposed in overlapping echelon arrangement to feed encountered forage from one thereof to the other for discharge into a single windrow and a predetermined swath turning position with the raking wheels shifted axially fore and aft to discharge encountered forage into a multiplicity of windrows; and releasable means latching the forward end portions of the draft elements alternately in said positions.

References Cited by the Examiner

UNITED STATES PATENTS

| 1,941,504 | 1/1934 | White | 172—588 X |
| 2,657,519 | 11/1953 | Hill | 56—377 |
| 2,836,030 | 5/1958 | Van Der Lely et al. | 56—377 |
| 3,098,341 | 7/1963 | Worrel | 56—377 |

FOREIGN PATENTS 196,164    2/1958    Austria.

ABRAHAM G. STONE, Primary Examiner.

ANTONIO F. GUIDA, Examiner.